United States Patent
Aminev

(10) Patent No.: US 11,370,300 B2
(45) Date of Patent: Jun. 28, 2022

(54) METHOD OF ADJUSTING THE OPERATION OF A TRANSPORTATION VEHICLE CONTROL SYSTEM, APPARATUS FOR USE IN THE METHOD, AND TRANSPORTATION VEHICLE AND COMPUTER PROGRAM

(71) Applicant: VOLKSWAGEN AKTIENGESELLSCHAFT, Wolfsburg (DE)

(72) Inventor: Timur Aminev, Braunschweig (DE)

(73) Assignee: Volkswagen Aktiengesellschaft

( * ) Notice: Subject to any disclaimer, the term of this patent is extended or adjusted under 35 U.S.C. 154(b) by 406 days.

(21) Appl. No.: 16/366,579

(22) Filed: Mar. 27, 2019

(65) Prior Publication Data

US 2019/0299783 A1 Oct. 3, 2019

(30) Foreign Application Priority Data

Mar. 28, 2018 (DE) .................. 10 2018 204 750.2

(51) Int. Cl.
*G06F 8/65* (2018.01)
*B60K 35/00* (2006.01)
*G01C 21/00* (2006.01)

(52) U.S. Cl.
CPC .............. *B60K 35/00* (2013.01); *G01C 21/00* (2013.01); *G06F 8/65* (2013.01); *B60K 2370/122* (2019.05)

(58) Field of Classification Search
CPC ........... G06F 8/65; G01C 21/00; B60K 35/00; B60K 2370/122
See application file for complete search history.

(56) References Cited

U.S. PATENT DOCUMENTS

| | | | |
|---|---|---|---|
| 7,860,621 B2 | 12/2010 | Decke et al. | |
| 8,291,109 B2 | 10/2012 | Tanaka | |
| 9,607,526 B1* | 3/2017 | Hsu-Hoffman | G09B 19/167 |
| 10,140,110 B2 | 11/2018 | Vangelov et al. | |
| 2001/0006388 A1 | 7/2001 | Kim et al. | |
| 2003/0018428 A1 | 1/2003 | Knockeart et al. | |
| 2011/0261201 A1* | 10/2011 | Fujii | B60R 1/00 348/148 |
| 2014/0309862 A1* | 10/2014 | Ricci | B60W 40/09 701/36 |
| 2015/0199162 A1 | 7/2015 | Platz et al. | |
| 2017/0024201 A1 | 1/2017 | Diedrich et al. | |

(Continued)

FOREIGN PATENT DOCUMENTS

| CN | 101150810 A | 3/2008 |
|---|---|---|
| CN | 106371856 A | 2/2017 |

(Continued)

*Primary Examiner* — Andrea C Leggett
(74) *Attorney, Agent, or Firm* — Barnes & Thornburg, LLP

(57) ABSTRACT

A method for adjusting the operation of a transportation vehicle control system which takes place via one or several operating menus of a user interface depicted on a display unit. Statistics are compiled of menu settings which the user has made for the transportation vehicle control system at least in a certain period of time. The statistics are stored in a memory unit of the transportation vehicle and are transferred to a management unit for evaluation. A software update is created for a program of the transportation vehicle control system customized to the needs of the driver and is transmitted to and installed in the transportation vehicle.

10 Claims, 5 Drawing Sheets

(56) References Cited

U.S. PATENT DOCUMENTS

2019/0152494 A1* 5/2019 Grossman ............. B60W 10/08
2019/0265868 A1* 8/2019 Penilla ................... G07C 5/008

FOREIGN PATENT DOCUMENTS

| CN | 107329663 A | 11/2017 |
| DE | 10162653 A1 | 7/2003 |
| DE | 102011111213 A1 | 2/2013 |
| DE | 112008001963 B4 | 11/2013 |
| DE | 102015103973 A1 | 10/2015 |
| DE | 102016008875 A1 | 2/2017 |
| WO | 2006119788 A1 | 11/2006 |

* cited by examiner

METHOD OF ADJUSTING THE OPERATION OF A TRANSPORTATION VEHICLE CONTROL SYSTEM, APPARATUS FOR USE IN THE METHOD, AND TRANSPORTATION VEHICLE AND COMPUTER PROGRAM

PRIORITY CLAIM

This patent application claims priority to German Patent Application No. 10 2018 204 750.2, filed 28 Mar. 2018, the disclosure of which is incorporated herein by reference in its entirety.

SUMMARY

Illustrative embodiment relate to the technical field of the operation of transportation vehicle control systems. Today, a variety of transportation vehicle control systems are used in transportation vehicles. Illustrative embodiments relate to a correspondingly-designed device for use in the method a transportation vehicle, and a computer program.

BRIEF DESCRIPTION OF THE DRAWINGS

Exemplary embodiments are depicted in the drawings and are described in greater detail based on the figures. The following are shown.

DETAILED DESCRIPTION

Figure 1:
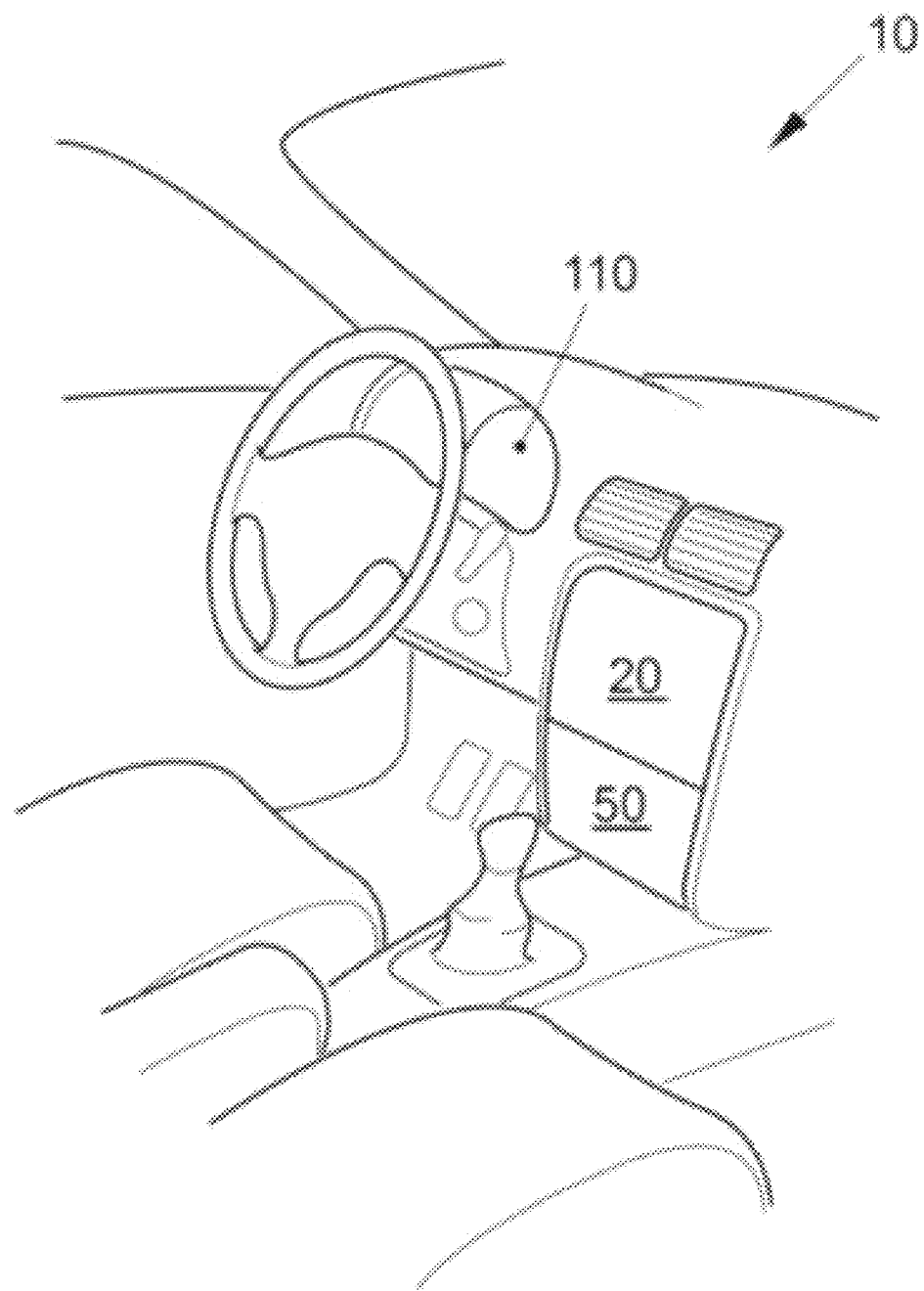
FIG. 1 shows the typical cockpit of a transportation vehicle.

Currently, intensive work is being carried out on technologies which aim to make autonomous driving possible in the future. A first approach is not to completely relieve drivers of their tasks, but rather to provide them with assistance. In addition, drivers will assume monitoring functions.

There is a wide range of transportation vehicle control systems in the transportation vehicle sector, and certainly in other vehicle sectors as well. Here, the emphasis is often on safety, as well as increasing driving comfort. A further facet is improving economy. Examples of transportation vehicle control systems include the following driver assist systems:
   Adaptive cruise control (ACC)
   Lane-keeping assist
   Lane-change assist
   Emergency braking assist
   Traffic jam assist
   Intelligent headlight control In addition to such driver assist systems, there are also transportation vehicle control systems in which it is possible to make a setting via operating menus. An example is a chassis control system in which various driving modes may be selected.

The following approaches in this field are already known from the prior art.

DE 10 2011 111 213 A1 discloses a method and a device for outputting information about a vehicle. Modern vehicles are becoming ever more complex. Drivers often are not familiar with all functions of the vehicle and are therefore not able to take full benefit of the capabilities of the vehicle. According to the approach in the document, the workload of the driver is ascertained, and a priority is assigned to each piece of information which is provided to the driver. At a given workload, only the information is output which exceeds a certain level of priority. The assigned priorities are modifiable as a function of the behavior of the driver while operating the vehicle.

DE 10 2016 008 875 A1 discloses a method for operating a vehicle. In this method, a vehicle proprietor or owner can activate a vehicle function for use, upon request.

US 2003/0018428 A1 discloses a vehicle information system. For navigating the vehicle, communication is carried out, via the communication module of the vehicle, with an external server which computes the navigation route and transmits it to the vehicle. A map update may also be transmitted to the vehicle.

It is difficult for the user to keep track of which settings options the transportation vehicle has, and to find the desired option amidst this variety of settings options. The operation of the various transportation vehicle control systems usually takes place via a user interface which uses a graphical user interface, such as operating menus displayed on a display unit. If the driver wants to change a setting while driving, there is a high potential for distraction if the adjustment options are presented in the conventional form. These problems have been recognized within the scope of the present disclosure.

Thus, additional improvements are needed for operating the various transportation vehicle control system via the infotainment system.

Disclosed embodiments simplify the operation of transportation vehicle control systems for the driver.

Disclosed embodiments provide a method for adjusting the operation of a transportation vehicle control system, a device for use in the method, a transportation vehicle, and a computer program.

The approach according to the disclosed method for adjusting the operation of a transportation vehicle control system comprises the following operations: The operation takes place via one or several operating menus of a user interface which are depicted on a display unit. Statistics are compiled of the menu settings which the user has made at least in a certain period of time. The statistics are stored in a memory unit of the transportation vehicle. The statistics are transmitted to an external management unit. The statistics are then evaluated in the management unit. Finally, as a function of the evaluation, a software update which is customized to the needs of the driver is created for a program of the transportation vehicle control system. The software update is transmitted to the transportation vehicle and reinstalled in the transportation vehicle. Thus, the driver receives a software update which is customized to the driver's needs.

In this case, it is beneficial if the customization takes place by modifying the arrangement of the operating menu items, in such a way that operating menu items which the user has frequently used according to statistics are placed in the operating menu at an easily accessible location, while operating menu items which are used little or not at all are placed in another location at which they are less accessible.

One disclosed embodiment positions the operating menu items which are placed in a less easily accessible location in a submenu.

It is also beneficial if, in addition to the frequency of use, the respectively chosen settings values are also recorded in the statistics. This is beneficial for conducting a more in-depth analysis of the transportation vehicle control system settings which the driver typically wants.

To do this, it is also beneficial if, in addition to the frequency of use, the driving situation in which the setting was made is also recorded in the statistics.

Another disclosed embodiment learns the behavior of the driver which is recorded via the statistics, by the customization on the part of the driver, so that the learned settings of the driver are automatically chosen in the future in the relevant driving situations, without the driver explicitly having to select these settings. The driver no longer has to make these settings explicitly and is thus relieved of this task.

For a device for use in the method, it is beneficial if the device comprises a display unit and a computing unit with a memory unit, at least one transportation vehicle control system, and a communication module. The computing unit is designed to record the user settings with respect to the at least one transportation vehicle control system in statistics, and to store them in the memory unit. In addition, the computing unit is furthermore designed so as to transmit the statistics via the communication module to an external management unit, and from there, to receive a software update which is adapted to the transmitted statistics, and to install it in the computing unit. Via this device, which can easily be integrated into existing components in the transportation vehicle, it is possible for the driver to obtain a software update which is customized to the driver's individual needs.

In addition, it is beneficial if the computing unit is designed to be programmable, and the period of time for recording the statistics is programmable. The user has the option to temporarily customize the statistics to a particular situation. One example would be a longer vacation trip, in which the driver is able to take more time to customize the settings for particular road conditions and driving situations.

The display unit is a touch-sensitive display unit (touchscreen) via which the settings may be made in the operating menus.

In addition, the same benefits mentioned in the claims containing the corresponding method operations also apply to the device for carrying out the method via the correspondingly programmed computing unit.

The disclosed device may be used in a transportation vehicle. In the transportation vehicle, the disclosed embodiments are implemented in such a way that the display unit is fixedly installed in the transportation vehicle, for example, as a touch-sensitive display unit. Nonetheless, a possible form of implementation would also be possible with the aid of data glasses, if the driver were to be allowed to use data glasses in the future.

The benefits described for the disclosed method correspondingly apply to a computer program which is used in the computing unit of the disclosed device for processing, to carry out the disclosed method.

The following description illustrates the principles of the disclosure. It is hereby understood that those skilled in the art will be capable of designing various arrangements which are not explicitly described here, but which incorporate principles of the disclosure, and which are also to be protected in terms of their scope.

FIG. 1 shows the typical cockpit of a transportation vehicle 10. A passenger transportation vehicle is depicted. However, any other vehicles would be possible as a transportation vehicle 10. Examples of other vehicles include buses, utility vehicles, in particular, trucks, farm machines, construction machines, rail vehicles, etc. The application of the present disclosure would generally be possible in the case of farm vehicles, rail vehicles, watercraft, and aircraft.

In the cockpit, a display unit of an infotainment system is highlighted by reference numerals. The display unit is a touch-sensitive display screen 20 which is installed in the center console.

The touch-sensitive display screen 20 is used for the operation of functions of the transportation vehicle 10. For example, a radio, a navigation system, playing of stored musical pieces, and/or a climate control system, other electronic devices, or other comfort functions or applications of the transportation vehicle 10, may be controlled via the display screen. The collective term "infotainment system" is often used. In transportation vehicles, in particular, passenger transportation vehicles, an infotainment system refers to the consolidation of the car radio, navigation system, hands-free equipment, driver assist system, and additional functions within a central operating unit. The term "infotainment" is a portmanteau word which is combined from the words "information" and "entertainment." The touch-sensitive display screen 20 is primarily used for operating the infotainment system, wherein this display screen 20 can be clearly seen and operated by a driver of the transportation vehicle 10, as well as by a front passenger in the transportation vehicle 10. In addition, mechanical operating elements, for example, buttons, rotary controls, or combinations thereof, for example, pressure rotary controls, could be arranged in an input unit 50 below the display screen 20. Typically, it is also possible to operate parts of the infotainment system via the steering wheel controls. For this purpose, the transportation vehicles are equipped with so-called multi-function steering wheel controls. This unit is not depicted separately, but is considered to be part of the input unit 50.

Figure 2:
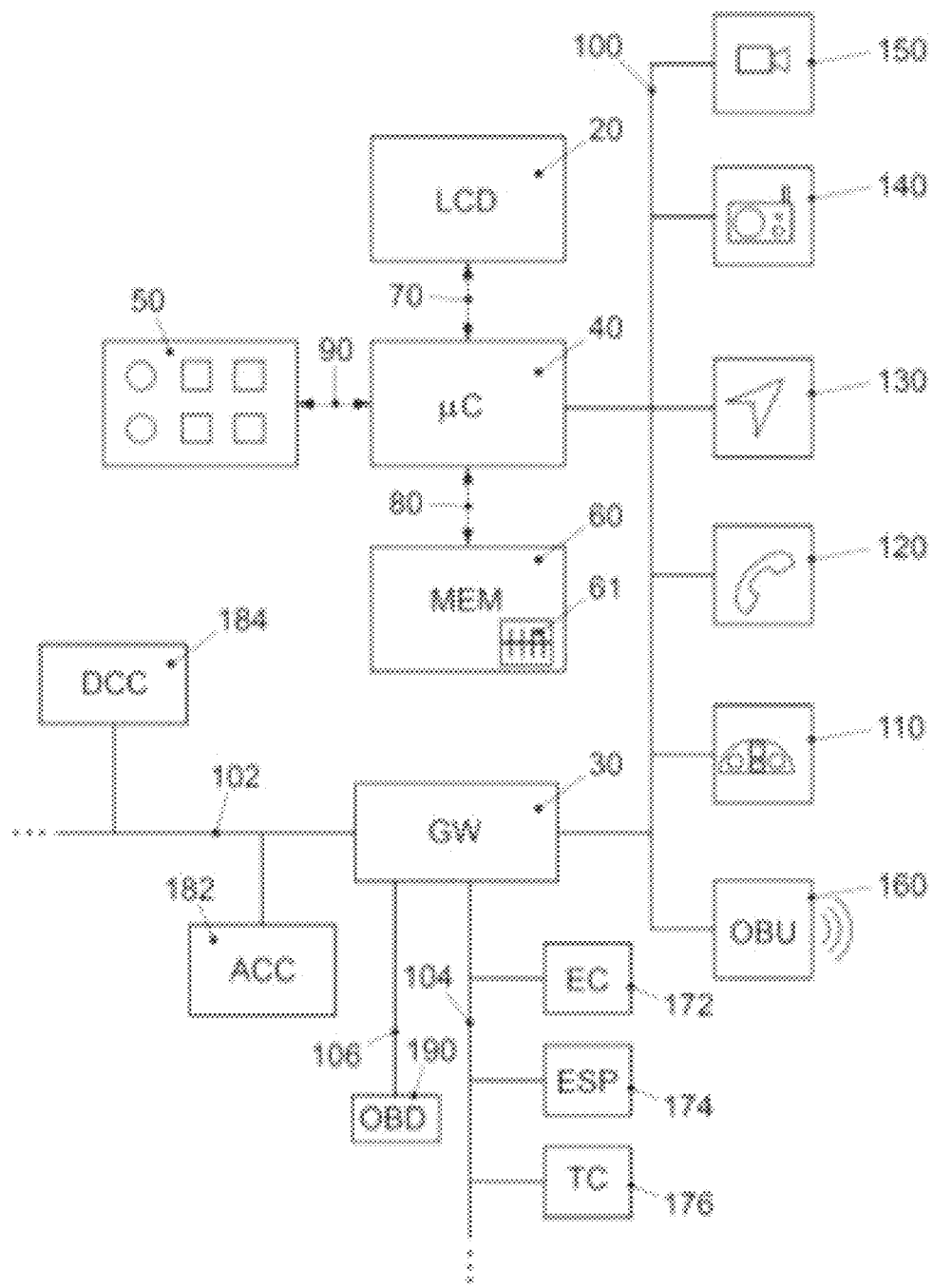
FIG. 2 shows a block diagram of the transportation vehicle network comprising the various networked control units of the transportation vehicle.

FIG. 2 schematically depicts a block diagram of the infotainment system 200, as well as several exemplary subsystems or applications of the infotainment system. The operator control device comprises the touch-sensitive display unit 20, a computing device 40, an input unit 50, and a memory 60. The display unit 20 comprises a display area for displaying volatile graphical information, as well as an operator interface (touch-sensitive layer) arranged on top of the display area for inputting commands by a user.

The display unit 20 is connected to the computing device 40 via a data line 70. The data line may be designed according to the LVDS (low-voltage differential signaling) standard. Via the data line 70, the display unit 20 receives control data from the computing device 40 for activating the display area of the touchscreen 20. Via the data line 70, control data of the commands which have been input are also transmitted from the touchscreen 20 to the computing device 40. The input unit is designated by the reference numeral 50. The input unit comprises the already-mentioned operating elements such as buttons, rotary controls, slide controls, or push-rotary controls, with the aid of which the operating person is able to make inputs via the menu instructions. The term "input" is generally understood to mean selecting a chosen menu option, as well as modifying a parameter, switching a function on and off, etc.

The memory unit 60 is connected to the computing device 40 via a data line 80. An icon directory and/or a symbol directory is stored in the memory 60 and contains the icons and/or symbols for the potential superimposition of additional information. The pixels/symbols which are used as the basis for computing the raster superimposition could also be stored here.

The additional parts of the infotainment system, including the camera 150, radio 140, navigation device 130, telephone 120, and instrument cluster 110 are connected via the data bus 100 to the device for operating the infotainment system. The high-speed properties of the CAN bus according to ISO standard 11898-2 is possible as the data bus 100. Alternatively, the use of a bus system based on Ethernet technology such as IEEE 802.03cg is, for example, also possible. Bus systems may also be used in which the data transmission takes place via optical waveguides. Examples include the MOST (media-oriented system transport) bus or the D2B (domestic digital bus). It should also be mentioned here that the camera 150 may be designed as a conventional video camera. In this case, the camera records 25 frames per second, which corresponds to 50 fields per second in the interlace recording mode. Alternatively, a special camera may be used which records a greater number of images per second, to increase the accuracy of the object detection in the case of more rapidly moving objects. A plurality of cameras may be used for monitoring the surroundings. In addition, radar (radio detection and ranging) or lidar (light detection and ranging) systems may be used in addition or alternatively, to carry out or expand the monitoring of the surroundings. The transportation vehicle 10 is equipped with a communication module 160 for inward and outward wireless communication. This module is often referred to as the on-board unit. The module may be designed for mobile radio communication, for example, according to the LTE (long-term evolution) standard. It may also be designed for WLAN (wireless LAN) communication, whether for communication with devices of the passengers in the transportation vehicle or for vehicle-to-vehicle communication, etc.

Figure 3:
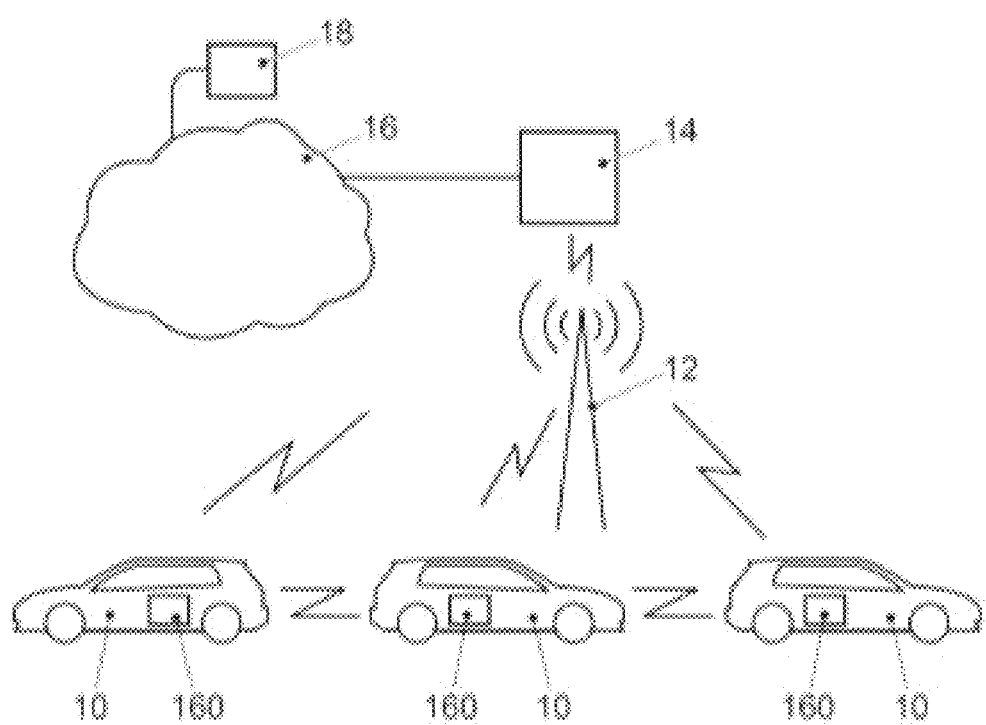
FIG. 3 shows the principle of transportation vehicle communication via mobile radio.

FIG. 3 shows the principle of the transportation vehicle communication. Each transportation vehicle 10 is equipped with the aforementioned communication module 160, which is used as a transceiver unit for the communication in a mobile radio network. A mobile radio base station is depicted and indicated by the reference number 12.

By virtue of the integrated communication module 160, the transportation vehicle 10 corresponds to a mobile radio network subscriber station. All messages from the transportation vehicles (uplink) and to the transportation vehicles (downlink) are either routed via the base station 12 which supplies a mobile radio cell, or in the case of direct transportation vehicle communication (sidelink), are exchanged directly between the transportation vehicles 10. If the transportation vehicles 10 are located within this mobile radio cell, they are registered with or subscribed to the base station 12. When the transportation vehicles leave the mobile radio cell, they are passed to the next base station 20 and are accordingly unsubscribed from the base station 20. The base station 20 also provides access to the Internet 16, so that the transportation vehicles 10 or all other mobile radio subscribers in the mobile radio cell are provided with Internet data. For this purpose, the base station 12 is connected via the so-called 51 interface to the EPC (evolved packet core) 14. A central back-end server 18 is also accessible via the Internet 16 or another wide-area network (WAN). This back-end server 18 is, for example, maintained by the transportation vehicle manufacturer, as will be described below in greater detail.

Such mobile radio technologies are standardized, and reference will be made here to the corresponding specifications of mobile radio standards. As a modern example of a mobile radio standard, reference is made to the 3GPP initiative and the LTE (Long-Term Evolution) standard. Many of the associated ETSI specifications are currently available in Version 14. The following specification is cited as an example of Version 13: ETSI TS 136 213 V13.0.0 (May 2016); Evolved Universal Terrestrial Radio Access (E-UTRA); Physical Layer Procedures (3GPP TS 36.213 Version 13.0.0 Release 13).

The disclosed method for adjusting the menu navigation for operating a driver assist system will be described below based on two exemplary embodiments.

Figure 4:
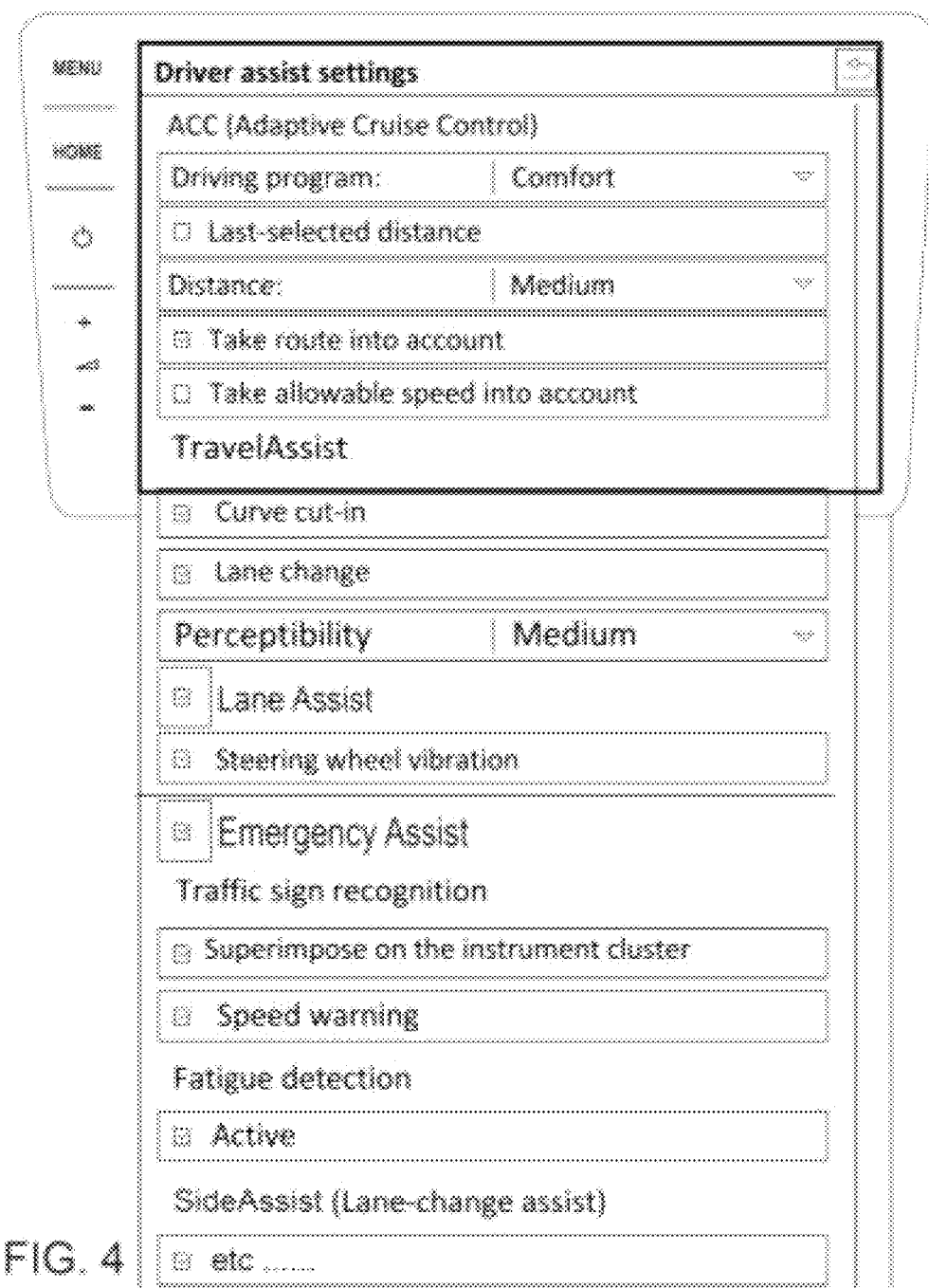
FIG. 4 shows the normal view of the "Settings" operating menu in a driver assist system for automatic distance control.

In the first exemplary embodiment, the "Driver assist settings" operating menu will be customized. This takes place as a function of the behavior of the driver. The driver initially has a settings menu for the driver assist system which appears as shown in FIG. 4. FIG. 4 shows the initial situation. The settings menu for the adaptive cruise control (ACC) comprises settings options for the Driving program: "Last-selected distance," and "Distance" including the options "Take route into account" and "Take allowable speed into account."

In the TravelAssist area, the settings menu comprises settings options for the options "Curve cut-in", "Lane change," "Lane assist," and "Steering wheel vibration" for haptic feedback. In addition, there is a comfort setting option for the perceptibility of the correction measures by the TravelAssist assistance system. There are additional options for Emergency Assist; in the "Traffic sign recognition" area, there are the options "Superimpose on the instrument cluster" and "Speed warning;" for Fatigue detection, there is the option "Active;" and there are other options for the Lane-change assist. The list of settings options may be significantly longer than depicted. The area visible on the display unit is indicated by the border. The other entries may be reached only by scrolling.

For example, it is necessary to scroll rather far down to come to the option for activation/deactivation of the Fatigue detection. If the driver makes this setting while driving, the long scrolling action may cause a significantly greater distraction from driving.

If the driver makes a setting in the operating menu, the use of this settings function is stored in the memory 40 in statistics which are specifically designated for it. Only the frequency of the use of this setting option is recorded in these statistics. In a different disclosed embodiment, the values set in each case could also be recorded. In this case, the identification of the driver may take place with the aid of the key which the driver is using. The statistics may be stored in the memory 40 in, for example, the following table:

| Setting parameter | Frequency of use | Setting value |
|---|---|---|
| Driving program | 5 | Comfort |
| Last-selected distance | 0 | |
| Distance | 0 | |
| Take route into account | 0 | |
| Take allowable speed into account | 0 | |
| Curve cut-in | 3 | |
| Lane change | 3 | |
| Perceptibility | 0 | |
| Lane assist | 0 | |
| Steering wheel vibration | 0 | |
| Emergency assist | 0 | |
| Superimpose on the | 0 | |

| Setting parameter | Frequency of use | Setting value |
|---|---|---|
| instrument cluster | | |
| Speed warning | 0 | |
| Fatigue detection | 2 | Active |
| SideAssist | 0 | |
| etc. | | |

In FIG. 2, the table is provided with the reference numeral 61. These statistics are transferred from time to time, for example, once per month, to the back-end server 18 of the transportation vehicle manufacturer for evaluation there. This may take place OTA (over the air) with the aid of the communication module 160.

During the evaluation of the data in the back-end server 18, it is determined, via the analysis software which is installed on the back-end server 18, that the driver has frequently adjusted the "Driving program" setting for the ACC driver assist, "Curve cut-in" and "Lane change" for the TravelAssist driver assist, and Fatigue detection, whereas the driver has not adjusted the remaining settings options.

Subsequently, a software update is created on the back-end server 18 in which the settings menu is customized to this driver. The new version of the customized software is also transmitted to the transportation vehicle over the air and installed there.

Figure 5:
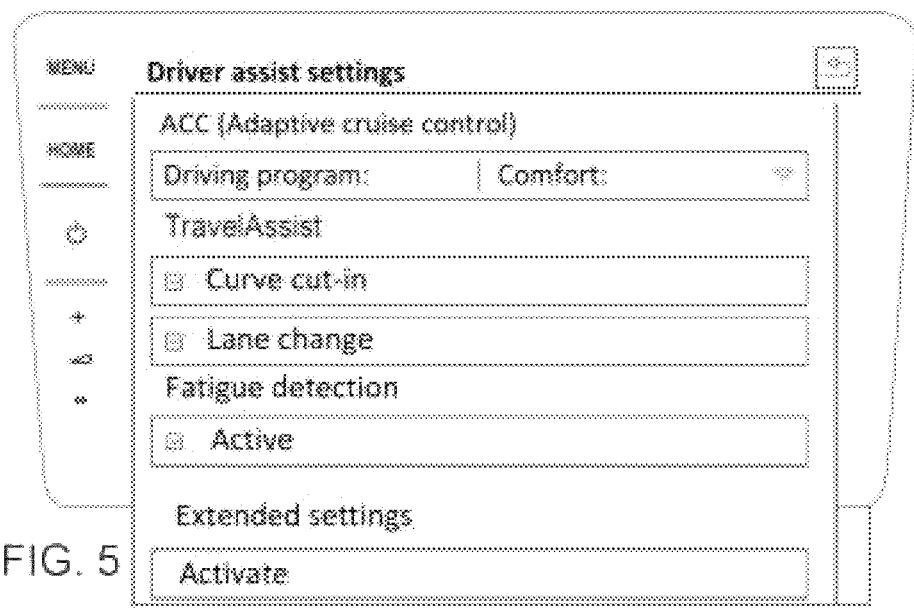
FIG. 5 shows the "Settings" operating menu after customization.

After the update, the settings menu appears as depicted in FIG. 5. The frequently used settings possibilities and options are sorted according to the frequency of use. The unused settings possibilities/options have been hidden in a sub-menu. These settings can be selected in the new "Extended settings" submenu and adjusted there.

Figure 6:
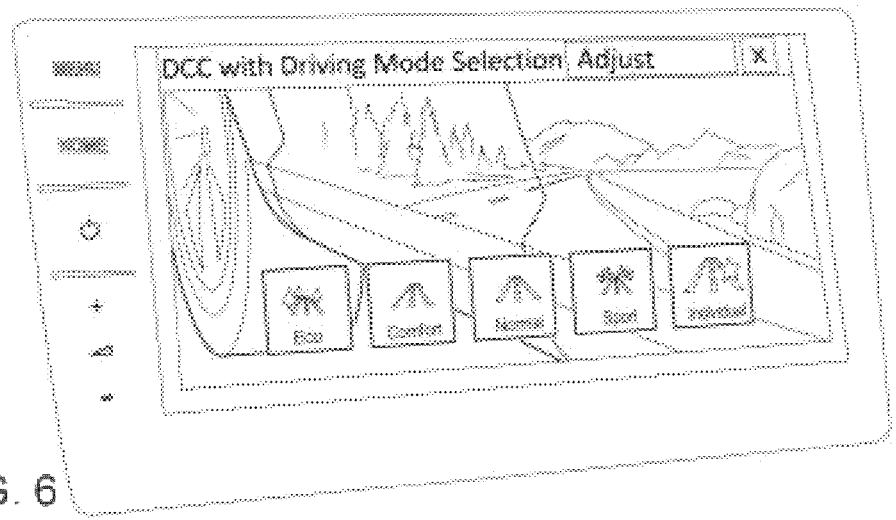
FIG. 6 shows the "Settings" operating menu in a driver assist system for automatic chassis adjustment.

Another exemplary embodiment will be described below. This example relates to settings in the DCC driver assist for chassis adjustment; see FIG. 6. Depending on the driving situation (federal highway, city, freeway, rain, evening (route from work), weekend (relaxed weekend drive, etc.)), the driver adjusts the setting for the driving modes in the "DCC with Driving Mode Selection" operating menu. The driving modes Eco, Comfort, Normal, Sport and Individual are available for selection.

If the driver makes a setting in the operating menu, the use of this setting function is in turn stored in the memory 40, in statistics which are specially designated for it. In addition to recording the frequency of use of this settings option in these statistics, the situation in which the driver prefers a given chassis setting is also registered. In this case, an additional setting may also be taken into account, which the driver also changes. The statistics may be stored in the memory 40 in, for example, the following table:

| Driving situation | Frequency | DCC mode | Additional setting |
|---|---|---|---|
| Federal highway | 10 | Comfort | |
| City traffic | 8 | Normal | |
| Freeway | 5 | Sport | |
| Rain | 2 | Eco | |
| Traffic jam | 1 | Comfort | ACC distance low |
| Work | 20 | Sports | |
| Weekend | 4 | Eco | |

The table 61 is in turn transmitted to the back-end server 18 after a period of use, for example, once per month. By the evaluation in the back-end server 18, the evaluation algorithm determines particular dependencies/habits of the driver; for example, if the driver drives on a rural highway, the "Comfort" mode is set. If the transportation vehicle is in transit in the city, a switch is always made to the "Normal" mode. If the transportation vehicle is in a traffic jam, the "Sport" mode is set. In this case, the smallest distance-time gap is simultaneously set in the settings for the ACC driver assist. These habits of the user are used to create a software update which is customized to the driver. This software update is also transmitted "over the air" to the transportation vehicle 10 and installed there.

By the customized software, the preferred settings are automatically set for the transportation vehicle 10 as soon as the learned conditions are met. This means that as soon as the transportation vehicle 10 turns onto a rural highway, the "Comfort" mode is automatically set for the DCC driver assist 184. The other settings for road traffic, freeway, etc. are thus automatically set. The navigation system 130 monitors the driven route, and the DCC driver assist 184 may access it from time to time via the transportation vehicle communication network to automatically select the appropriate setting.

All examples mentioned herein, as well as conditional formulations, are to be understood as not being restricted to such specifically cited examples. For example, it will be recognized by those skilled in the art that the block diagram depicted here depicts a conceptual view of an exemplary switching arrangement. In a similar manner, it will be apparent that a depicted flow chart, state transition diagram, pseudocode, and the like, depict different options for depicting processes which are essentially stored in computer-readable media and can therefore be executed by a computer or processor. The object mentioned in the patent claims may expressly also be a person.

It should be understood that the proposed method and the associated devices may be implemented in various forms of hardware, software, firmware, special processors, or a combination thereof. Special processors may comprise application-specific integrated circuits (ASICs), reduced-instruction set computers (RISCs), and/or field-programmable gate arrays (FPGAs). Optionally, the proposed method and the device are implemented as a combination of hardware and software. The software may be installed as an application program on a program storage device. The device is typically a machine based on a computer platform which comprises hardware, for example, one or a plurality of central processing units (CPUs), a random-access memory (RAM), and one or a plurality of input/output (110) interfaces. In addition, an operating system is typically installed on the computer platform. The various processes and functions which have been described here may be part of the application program or a part which is executed via the operating system.

The disclosure is not limited to the exemplary embodiments described here. There is room for various adaptations and modifications which those skilled in the art would also take into account as belonging to the disclosure, on the basis of their expert knowledge.

LIST OF REFERENCE CHARACTERS

10 Transportation vehicle
12 Mobile radio base station
14 Evolved packet core
16 Internet
18 Management unit
20 Touch-sensitive display unit
30 Gateway
40 Computing unit 50 Input unit
60 Memory unit
61 Statistics
70 Data line to the display unit
80 Data line to the memory unit
90 Data line to the input unit
100 First data bus
102 Second data bus
104 Third data bus
106 Fourth data bus
110 Instrument cluster
120 Telephone
130 Navigation device
140 Radio
150 Camera
160 Communication module
172 Engine control unit
174 ESP control unit
176 Transmission control unit
182 Distance control unit
184 Chassis control unit
190 On-board diagnostics plug

The invention claimed is:

1. A device for adjusting operation of a transportation vehicle control system, the device comprising:
a display unit, wherein the operation of the transportation vehicle control system takes place via at least one user interface menu which is depicted on the display unit;
a computing unit with a memory unit, wherein the computing unit records at least one statistic that includes a frequency of use during a period of time of each user setting of a plurality of user settings of the at least one transportation vehicle control system, and stores the at least one statistic in the memory unit; and
a communication module, for transmitting the at least one statistic to an external management unit, wherein the at least one statistic is evaluated in the external management unit to generate a software update for a program of the transportation vehicle control system, which is based at least in part on the recorded frequency of use of the at least one statistic and which is customized to needs of the user, and transmitted to the transportation vehicle for installation in the computing unit of the transportation vehicle,
wherein the arrangement of operating menu items in the at least one user interface menu is changed by the customization so that the operating menu items which the user has used more frequently according to the at least one statistic are positioned in the at least one user interface menu at a relatively more accessible location in comparison to operating menu items which are used less or not at all by the user according to the at least one statistic.

2. The device of claim 1, wherein the computing unit is programmable and wherein the period of time for recording the at least one statistic is programmable.

3. The device of claim 1, wherein the display unit is a touch-sensitive display unit via which the settings are made in the at least one user interface menu.

4. A transportation vehicle comprising the device of claim 1.

5. A non-transitory computer readable medium including a computer program, which, when executed on a computer processor controls a method for adjusting operation of a transportation vehicle control system, the method comprising:
recording, by a computing unit with a memory unit, at least one statistic that includes a frequency of use during a period of time of each user setting of a plurality of user settings of at least one transportation vehicle control system, wherein operation of the transportation vehicle control system takes place via at least one user interface menu which is depicted on a display unit;
storing, by the computing unit, the at least one statistic in the memory unit;
transmitting, by a communication module, the at least one statistic to an external management unit, wherein the at least one statistic are evaluated in the external management unit to generate a software update for a program of the transportation vehicle control system, which is based at least in part on the recorded frequency of use of the at least one statistic and which is customized to needs of the user, and transmitted to the transportation vehicle for installation in the computing unit of the transportation vehicle;
receiving, by the communication module, the software update; and
installing the software update for the transportation vehicle control system,
wherein the arrangement of operating menu items in the at least one user interface menu is changed by the customization so that the operating menu items which the user has used more frequently according to the at least one statistic are positioned in the at least one user interface menu at a relatively more accessible location in comparison to operating menu items which are used less or not at all by the user according to the at least one statistic.

6. A method for adjusting operation of a transportation vehicle control system, the method comprising:
recording, by a computing unit with a memory unit, at least one statistic that includes a frequency of use during a period of time of each user setting of a plurality of user settings of at least one transportation vehicle control system, wherein operation of the transportation vehicle control system takes place via at least one user interface menu which is depicted on a display unit;
storing, by the computing unit, the at least one statistic in the memory unit;
transmitting, by a communication module, the at least one statistic to an external management unit, wherein the at least one statistic are evaluated in the external management unit to generate a software update for a program of the transportation vehicle control system, which is based at least in part on the recorded frequency of use of the at least one statistic and which is customized to needs of the user, and transmitted to the transportation vehicle for installation in the computing unit of the transportation vehicle;
receiving, by the communication module, the software update; and
installing the software update for the transportation vehicle control system,
wherein the arrangement of operating menu items in the at least one user interface menu is changed by the customization so that the operating menu items which the user has used more frequently according to the at least one statistic are positioned in the at least one user interface menu at a relatively more accessible location in comparison to operating menu items which are used less or not at all by the user according to the at least one statistic.

7. The method of claim 6, wherein the operating menu items which are used less or not at all by the user according to the at least one statistic are placed in a submenu.

8. The method of claim 6, further comprising recording the settings values in the at least one statistic.

9. The method of claim 6, wherein a driving situation of the transportation vehicle during which the setting was made is also recorded in the at least one statistic.

10. The method of claim 9, wherein driver behavior recorded by the at least one statistic is learned so customization of settings for the driver are automatically chosen in the future in the relevant driving situations without the driver explicitly having to select these settings.

* * * * *